(12) United States Patent
Fukami et al.

(10) Patent No.: US 10,095,960 B2
(45) Date of Patent: *Oct. 9, 2018

(54) PRINTING MANAGING APPARATUS AND COMPUTER READABLE MEDIUM STORING PRINTING MANAGING PROGRAM

(71) Applicant: FUJI XEROX CO., LTD., Tokyo (JP)

(72) Inventors: Dai Fukami, Yokohama (JP); Taku Matsuo, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,666

(22) Filed: Apr. 10, 2018

(65) Prior Publication Data
US 2018/0225556 A1    Aug. 9, 2018

Related U.S. Application Data

(63) Continuation of application No. 15/494,823, filed on Apr. 24, 2017, now Pat. No. 9,965,706.

(30) Foreign Application Priority Data

Oct. 21, 2016 (JP) .................................. 2016-207131

(51) Int. Cl.
  *G06K 15/02* (2006.01)
  *G06F 3/12* (2006.01)
(52) U.S. Cl.
  CPC ....... *G06K 15/1805* (2013.01); *G06F 3/1205* (2013.01); *G06F 3/1231* (2013.01); *G06F 3/1256* (2013.01); *G06F 3/1288* (2013.01)

(58) Field of Classification Search
  CPC .......................... G06K 15/1805; G06F 3/1205
  See application file for complete search history.

(56) References Cited

U.S. PATENT DOCUMENTS

| | | | | |
|---|---|---|---|---|
| 6,081,342 A * | 6/2000 | Nakai | ................ | H04N 1/32358 358/1.15 |
| 2014/0139859 A1 | 5/2014 | Saito | | |
| 2015/0331639 A1* | 11/2015 | Piazza | ................... | G06F 3/1285 358/1.14 |

FOREIGN PATENT DOCUMENTS

EP         1191450 A1    3/2002

OTHER PUBLICATIONS

Dec. 7, 2017 Extended Search Report issued in European Patent Application No. 17171467.8.
Jan. 10, 2018 Notice of Allowance issued in U.S. Appl. No. 15/494,823.

* cited by examiner

*Primary Examiner* — Ibrahim Siddo
(74) *Attorney, Agent, or Firm* — Oliff PLC

(57) ABSTRACT

A printing managing apparatus includes: a job attribute correlating information acquiring unit that acquires job attribute correlating information that correlates pieces of individual job attribute information used in plural respective printing control apparatus with common job attribute information for each job attribute that can be set in print job information so as to be common to the plural printing control apparatus as transmission destination candidates of the print job information; an attribute specification information converting unit as defined herein; and a manipulation control processing unit as defined herein.

2 Claims, 8 Drawing Sheets

FIG. 3

JOB ATTRIBUTE CONVERSION INFORMATION

| JOB ATTRIBUTE NAME | COMMON JOB ATTRIBUTE (COMMON ATTRIBUTE NAME) | INDIVIDUAL JOB ATTRIBUTE (ATTRIBUTE PARAMETER NAME) | | |
|---|---|---|---|---|
| | | CONTROLLER A | CONTROLLER B | CONTROLLER C |
| NUMBER OF COPIES | CmnCopy | copy | Copies | busuu |
| SHEET | Cmnmedia | paper | media | youshi |
| EJECTION DESTINATION | CmnTray | ATray | BTray | CTray |
| . . . | | | | |

FIG. 4

JOB STSATUS ATTRIBUTE CONVERSION INFORMATION

| JOB STATUS | COMMON JOB STATUS ATTRIBUTE (COMMON JOB STATUS NAME) | INDIVIDUAL JOB STATUS ATTRIBUTE (JOB STATUS PARAMETER NAME) | | |
|---|---|---|---|---|
| | | CONTROLLER A | CONTROLLER B | CONTROLLER C |
| FROM START TO COMPLETION OF RECEPTION | CmnWaiting | Waiting | - | - |
| FROM COMPLETION OF RECEPTION TO COMPLETION OF PROCESSING | CmnPrinting | inprogress | Printing | job-Printing |
| . . . | | | | |

FIG. 5

PRINTER STSATUS ATTRIBUTE CONVERSION INFORMATION

| PRINTER STATUS | COMMON PRINTER STATUS ATTRIBUTE (COMMON PRINTER STATUS NAME) | INDIVIDUAL PRINTER STATUS ATTRIBUTE (PRINTER STATUS PARAMETER NAME) | | |
|---|---|---|---|---|
| | | CONTROLLER A | CONTROLLER B | CONTROLLER C |
| IDLING | CmnIdle | idle | idling | taiki |
| POWER-OFF | CmnDown | down | off | poweroff |
| ... | | | | |

FIG. 6

ATTRIBUTE SPECIFICATION INFORMATION

JOB ATTRIBUTE (SHEET):
    paper
ATTRIBUTE VALUES:
    A3
    A4white
    A4green
    A4yellow
JOB ATTRIBUTE (NUMBER OF COPIES):
    copy
ATTRIBUTE VALUES:
    1-999
    . . .

(a)

↑ CONVERSION

JOB ATTRIBUTE (SHEET):
    Cmnmedia
ATTRIBUTE VALUES:
    A3
    A4white
    A4green
    A4yellow
JOB ATTRIBUTE (NUMBER OF COPIES):
    Cmncopy
ATTRIBUTE VALUES:
    1-999
    . . .

| Job manipulations | | | | | | | Printer job manipulations | | | | |
|---|---|---|---|---|---|---|---|---|---|---|---|
| Transmit | Edit | Copy | Delete | | | | Print/restart | Test printing | Temporary halt | Cancel | |
| ☐ | ID | Job name | Printer job ID | Printing status | Number of copies | Transmission destination | Logical printer | Date of delivery | Details | | |
| ☐ | 1 | Job A | 1001 | Complete | 1 | Phin01 | LP-A | Today | ⓘ | | |
| ☐ | 2 | Job B | 1002 | Being printed | 2 | Phin01 | LP-B | | ⓘ | | |
| ☐ | 3 | Job C | 1003 | Suspended | 1 | Matte01 | LP-C | | ⓘ | | |
| ☐ | 4 | Job D | - | Unsent | 10 | Not assigned | LP-D | | ⓘ | | |
| ☐ | 5 | Job E | - | Unsent | 10 | Not assigned | LP-B | | ⓘ | | |
| ☐ | 6 | Job F | - | Unsent | 1 | Matte01 | LP-C | | | | | admin | Log-out | Password change | Version | Help

Job Management | Printer Management | User Management | System Management

ID: 2  Job name: Job B
Phie01: Printing
Type: XXXXX
IP address: x.x.x.x
Logical printer: LP-A ID:  Job name:
Matt01: Suspended
Type: XXXXX
IP address: x.x.x.x
Logical printer: LP-C

JOB MANAGEMENT

FIG. 9

```
JOB EDITING                    [← Preceding job]  [Next job →]

Job ID                  6
Job name                [                    ]
Number of copies        [1]
Transmission destination [Matt01        ▾]
Logical printer         [LP-C           ▾]
Stock                   [A4_White_Plain ▾]
Profiles                ☑ CMYK color correction
                          ◉ Device profile
                            [Depends on printer setting. ▾]
                            Output profile
                            [Standard profile            ▾]
                          ○ CMYK input profile
                            [                            ▾]
                            Output profile
                            [                            ▾]
                        ☐ CMYK source burying
Ejection destination    [Tray1          ▾]
Sender name             [Job management option]
Date of delivery        [7/20]
                        [Cancel]  [Apply]  [Store]
```

APPARATUS CONVERSION INFORMATION

| CONTROLLER ID | PRINTER MODEL NAME |
|---|---|
| A | model A |
| B | model BB |
| C | model C001 |

PRINTING MANAGING APPARATUS AND COMPUTER READABLE MEDIUM STORING PRINTING MANAGING PROGRAM

This is a Continuation of application Ser. No. 15/494,823 filed Apr. 24, 2017, which claims the benefit of Japanese Application No. 2016-207131 filed Oct. 21, 2016. The entire disclosures of the prior applications are hereby incorporated by reference herein in its entirety.

BACKGROUND

1. Technical Field

The present invention relates to a printing managing apparatus and a computer readable medium storing a printing managing program.

2. Related Art

Production printers are combinations of a printer and a controller, and a printing managing server causes each printer to perform printing under the control of the associated controller by sending print job information to the controller.

Each controller provides a manipulation picture through which to make a manipulation for, for example, causing execution of or editing a print job. A job administrator or the lie who uses the printing managing server inputs desired attribute values for various job attributes through a manipulation picture that is provided by the controller of a production printer he or she wants to have carry out printing, and sends resulting print job information to the associated printer.

SUMMARY

According to an aspect of the invention, there is provided a printing managing apparatus comprising: a job attribute correlating information acquiring unit that acquires job attribute correlating information that correlates pieces of individual job attribute information used in plural respective printing control apparatus with common job attribute information for each job attribute that can be set in print job information so as to be common to the plural printing control apparatus as transmission destination candidates of the print job information; an attribute specification information converting unit that converts the pieces of individual job attribute information of attribute specification information that is transmitted from a printing control apparatus and contains pieces of individual job attribute information indicating job attributes that can be set in the printing control apparatus and sets of attribute values that can be designated for the respective job attributes into respective pieces of common job attribute information using the job attribute correlating information; and a manipulation control processing unit that links manipulation target print job information with the attribute specification information using pieces of common job attribute information indicating job attributes that are set in the manipulation target print job information, and displays the manipulation target print job information in a print job information manipulation picture that is set so as to be common to the plural printing control apparatus to allow a manipulation on the displayed print job information.

BRIEF DESCRIPTION OF THE DRAWINGS

Exemplary embodiments of the present invention will be described in detail based on the following figures, wherein:

FIG. 3 is a table showing an example data structure of job attribute conversion information which is stored in a conversion rule memory employed in the exemplary embodiment;

FIG. 4 is a table showing an example data structure of job status attribute conversion information which is stored in the conversion rule memory employed in the exemplary embodiment;

FIG. 5 is a table showing an example data structure of printer status attribute conversion information which is stored in the conversion rule memory employed in the exemplary embodiment;

FIG. 6 includes parts (a) and (b), and (a) of FIG. 6 is a general data structure of attribute specification information transmitted from a controller in the exemplary embodiment and (b) of FIG. 6 shows a general data structure of attribute specification information that is generated by converting the attribute specification information shown in (a) of FIG. 6 by a conversion unit and is to be stored in a converted information memory;

FIG. 7 shows a display example of a job management picture used in the exemplary embodiment;

FIG. 9 shows a display example of a job editing picture used in the exemplary embodiment; and FIG. 10 is a table showing an example data structure of apparatus conversion information that is stored in the conversion rule memory employed in the exemplary embodiment.

DESCRIPTION OF SYMBOLS

1: Client terminal; 2: Controller; 3: Printer; 10: Printing managing server; 11: Commonization processing unit; 12: User interface (UI) control processing unit; 13: Conversion unit; 14: Job memory; 15: Conversion rule memory; 16: Converted information memory; 21: CPU; 22: ROM; 23: RAM; 24: Hard disk drive (HDD); 25: Mouse; 26: Keyboard; 27: Display; 28: Input/output controller; 29: Network controller; 30: Internal bus.

DETAILED DESCRIPTION

A preferred exemplary embodiment of the present invention will be hereinafter described with reference to the drawings.

Figure 1:
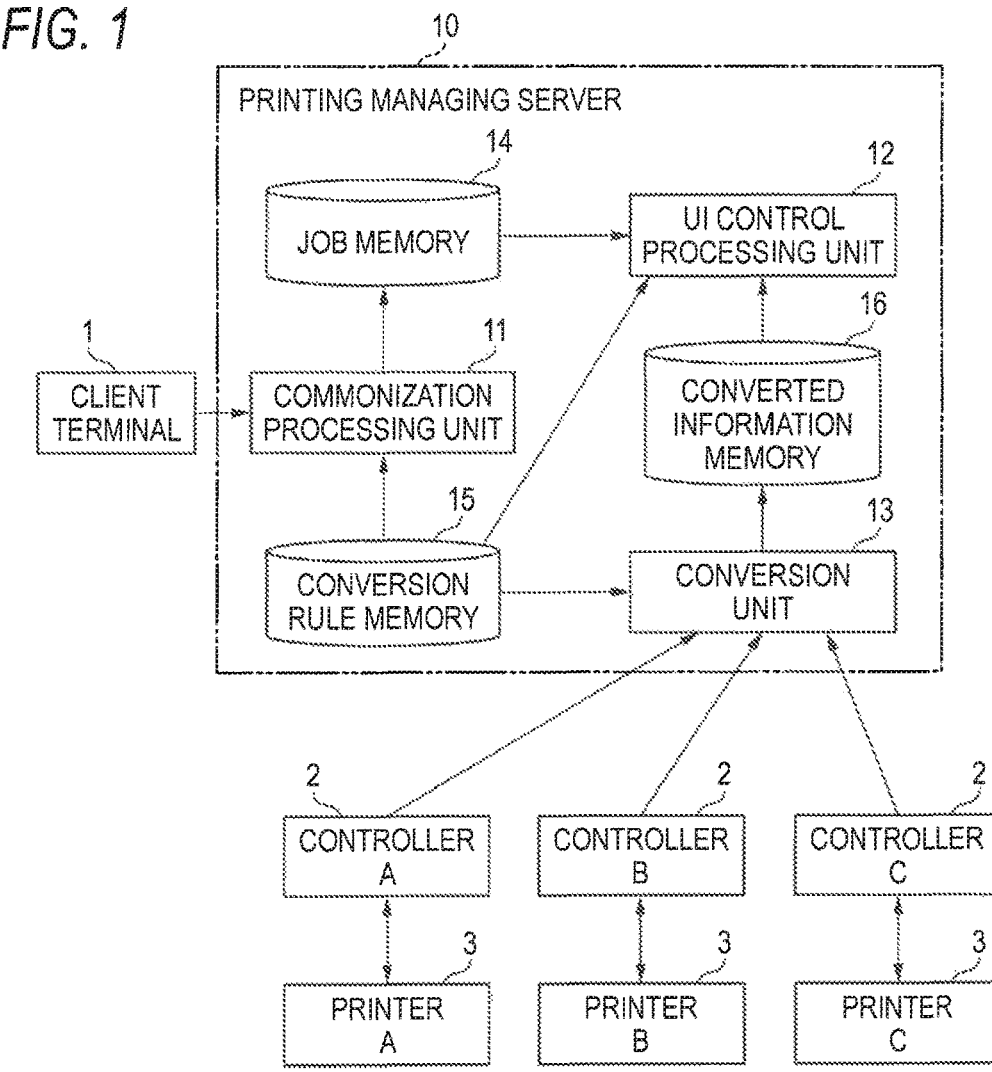
FIG. 1 is a block diagram showing the overall configuration of a printing system according to an exemplary embodiment of the present invention and the configuration of a printing managing server employed therein which corresponds to the printing managing apparatus according to the invention.

FIG. 1 is a block diagram showing the overall configuration of a printing system according to the exemplary embodiment and the configuration of a printing managing server 10 employed therein which corresponds to the printing managing apparatus according to the invention. FIG. 1 shows a client terminal 1, controllers 2, printers 3, and the printing managing server 10. The printing managing server 10 is connected to the client terminal 1 so as to communicate with it over a network (not shown) and is likewise connected to each controller 2.

The client terminal 1 requests the printing managing server 10 to perform printing by sending print job information to it. Although FIG. 1 shows only one client terminal 1 for the sake of convenience, in actuality the printing managing server 10 receives print jobs from plural client terminals 1. Each set of a controller 2 and a printer 3 constitutes a production printer. Each controller 2 is a printing control apparatus that performs a printing control on the printer 3 connected to it according to print job information transmitted from the printing managing server 10. Each printer 3 is a printing apparatus which performs printing under the control of the associated controller 2.

Although FIG. 1 shows three controllers A-C, the number of controllers connected to the printing managing server 10 is not limited to three. In the exemplary embodiment, the controllers A-C will be referred to generically as "controllers 2" in describing a configuration or processing common to them. Likewise, printers A-C will be referred to generically as "printers 3" in describing a configuration or processing common to them.

In the exemplary embodiment, it is assumed that the controllers A-C are of different types. Thus, user interface (UI) pictures provided by the respective controllers A-C are different from each other. The term "different" means that the layout of job attribute setting spaces, the job attribute value input methods, the manners of transitions between pictures, and other things are different. The controllers A-C are also different from each other in the support attributes. The support attributes mean job attributes that can be specified in each controller 2. The support attributes consist of job attributes that are common to the controllers A-C (hereinafter referred to as "common attributes") and job attributes other than the common attributes (hereinafter referred to as "specifiable attributes").

Several terms to be used in the exemplary embodiment will be described below. The term "job attribute" means an instruction attribute that is set in a print job (print job information) according which to cause a printer 3 to perform printing. Example job attributes are the number of copies, color/monochrome, a sheet size, single-sided/double-sided, and an ejection destination. The term "attribute value" means a parameter value that can be set for each job attribute. For example, the job attribute "sheet size" has attribute values "A3," "A4," etc.

Not only are the controllers 2 may different from each other in the support attributes depending on the manufacturer, the apparatus type, etc., but also even an individual job attribute corresponding to a common attribute may vary from one controller 2 to another. In the exemplary embodiment, for the sake of convenience, the individual job attribute will be referred to as an "attribute parameter name." As exemplified in FIG. 3, for a job attribute "the number of copies (printed sheets)," attribute parameter names "copy," "Copies," and "busuu" are used in the controllers A, B, and, C, respectively. In this manner, different attribute parameter names may be used for the same job attribute in the respective controllers 2.

Figure 2:
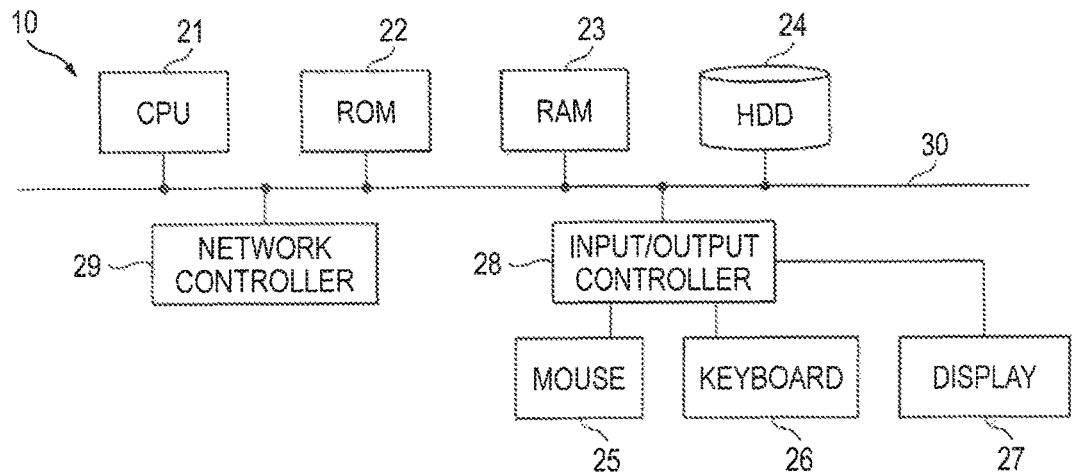
FIG. 2 is a block diagram showing the hardware configuration of a server computer that constitutes the printing managing server according to the exemplary embodiment.

FIG. 2 is a block diagram showing the hardware configuration of a server computer that constitutes the printing managing server 10 according to the exemplary embodiment. In the exemplary embodiment, the server computer that constitutes the printing managing server 10 can be implemented so as to have a conventional, general-purpose hardware configuration. More specifically, as shown in FIG. 2, the printing managing server 10 is configured in such a manner that a CPU 21, a ROM 22, a RAM 23, a hard disk drive (HDD) 24, an input controller 28 to which a mouse 25 and a keyboard 26 (input units) and a display 27 (display device) are connected, and a network controller 29 (communication unit) are connected to an internal bus 30.

Returning to FIG. 1, the printing managing server 10 according to the exemplary embodiment is equipped with a commonization processing unit 11, a user interface (UI) control processing unit 12, a conversion unit 13, a job memory 14, a conversion rule memory 15, and a converted information memory 16. Constituent units that will not be used for the description of the exemplary embodiment are omitted in FIG. 1.

Print job information that is written according to a format that conforms to one of the controllers 2 is transmitted from the client terminal 1. The commonization processing unit 11 (corresponding to the print job information converting unit according to the invention) converts attribute parameter names of common attributes contained in a print job written according to any of various formats into pieces of common job attribute information (common job attributes) using job attribute conversion information that is stored in the conversion rule memory 15, and stores converted print job information in the job memory 14.

Attribute specification information containing job attributes (support attributes) that can be set in each controller 2 and sets of attribute values that can be designated for the job attributes are transmitted from the controller 2, for example, in response to a regular inquiry from the printing managing server 10. Since the job attributes contained in the attribute specification information is in the form of attribute parameter names of the controller 2, the conversion unit 13 (corresponding to the attribute specification information converting unit according to the invention) converts the attribute parameter names into common job attributes by referring to the job attribute conversion information and stores resulting attribute specification information in the converted information memory 16.

Attribute parameter names that are set in each of a print job and attribute specification information are converted into common job attributes by the commonization processing unit 11 or the conversion unit 13. The user interface control processing unit 12 functions as the manipulation control processing unit which links, using the common job attributes, a print job and attribute specification information whose attribute parameter names have been converted into the common job attributes, and causes information relating to the print job etc. to be displayed in a job manipulation picture (configured by various kinds of display areas about the job and menu for the manipulation) that is set so as to be common to the controllers 2 on the basis of the linked information to enable a manipulation on the displayed information.

Various kinds of conversion information shown in FIGS. 3-5 are set and registered in the conversion rule memory 15 in advance. Although it is assumed that the various kinds of conversion information registered in the conversion rule memory 15 are written according to the XML format, in the exemplary embodiment they are shown in table form to facilitate understanding of their data structures.

FIG. 3 is a table showing an example data structure of job attribute conversion information which is stored in the conversion rule memory 15 employed in the exemplary embodiment. The job attribute conversion information is job attribute correlating information that correlates individual job attributes (attribute parameter names) of the respective controllers A-C with a common job attribute (common attribute name) for each job attribute that can be set in a print job so as to be common to the printers A-C as its transmission destination candidates. Job attribute names are added in FIG. 3 to show the meanings of respective job attributes. Pieces of information relating to only the common attributes are set and registered in the job attribute conversion information.

FIG. 4 is a table showing an example data structure of job status attribute conversion information which is stored in the conversion rule memory 15 employed in the exemplary embodiment. The job status means the status of a print job that has been transmitted to a controller 2. As in the case of the job attributes, pieces of individual status information (individual job status attributes) corresponding to even the same job status attribute which is a status attribute indicating a job status may be different from each other. In the exemplary embodiment, for the sake of convenience, the individual job status attribute is referred to as a "job status parameter name." As exemplified in FIG. 4, for a job status attribute indicating a status from completion of reception of a print job to completion of processing on it, job status parameter names "inprogress," "Printing," and "job-printing" are used in the controllers A, B, and, C, respectively. In this manner, different job status parameter names may be set for the same job status attribute in the respective controllers 2.

The job status attribute conversion information is status information correlating information that correlates pieces of individual status information (job status parameter names) showing statuses, in the respective controllers A-C, of a print job that has been transmitted to the controllers A-C with common status information (common job status attribute) indicating the status. Job statuses are added in FIG. 4 to show the meanings of respective job status attributes.

FIG. 5 is a table showing an example data structure of printer status attribute conversion information which is stored in the conversion rule memory 15 employed in the exemplary embodiment. The printer status means the status of a printer 3 to perform printing according to a print job information that has been transmitted to the associated controller 2. As in the case of the job status attributes, pieces of individual printing apparatus status information (individual printer status attributes) indicating even the same printer status attribute which is a printing apparatus status attribute indicating a printer status may be different from each other. In the exemplary embodiment, for the sake of convenience, the individual printer status attribute is referred to as a "printer status parameter name." As exemplified in FIG. 5, for a printer status attribute indicating a power-off state, printer status parameter names "down," "off," and "poweroff" are used in the controllers A, B, and, C, respectively. In this manner, different printer status parameter names may be set for the same printer status attribute in the respective controllers 2.

The printer status attribute conversion information is printing apparatus status information correlating information that correlates pieces of individual printing apparatus status information (printer status parameter names) showing, in the controllers A-C, a status of the printer 3 to perform printing according to print job information that has been transmitted to the controllers A-C with common printing apparatus status information (common printer status attribute) indicating the printing apparatus status. Printer statuses are added in FIG. 5 to show the meanings of respective printer status attributes.

The converted information memory 16 will be described later.

The units 11-13 of the printing managing server 10 are implemented through cooperation between a computer that constitutes the printing managing server 10 and programs that operate on a CPU 21 of the computer. The memories 14-16 are implemented in the HDD 24 which is installed in the printing managing server 10. Alternatively, the memories 14-16 may be implemented using the RAM 23 or using an external storage means via a network.

The programs used in the exemplary embodiment can be provided not only via a communication means but also in a state that they are stored in a computer-readable storage medium such as a CD-ROM or a USB memory. The programs that have been provided via the communication means or the storage medium are installed in the computer and run by the CPU 21 of the computer when necessary, whereby various kinds of processing are realized.

Next, a description will be made of how the printing managing server 10 according to the exemplary embodiment operate.

First, a print job is transmitted from the client terminal 1 with certain timing. As mentioned above, the print job transmitted from the client terminal 1 is written according to a format that conforms to one of the controllers 2. Or the client terminal 1 may generate a print job on its own using an application provided in the printing managing server 10. The client terminal 1 accesses the printing managing server 10 using a general-purpose browser such as a web browser. The commonization processing unit 11 identifies the format of the print job by analyzing it, converts attribute parameter names contained in the print job into the common job attributes by referring to the job attribute conversion information, and registers the print job in the job memory 14.

On the other hand, attribute specification information is transmitted regularly from each controller 2. Although in the exemplary embodiment each controller 2 sends attribute specification information in response to an inquiry from the printing managing server 10, the printing system may be such that each controller 2 sends attribute specification information independently.

(a) of FIG. 6 shows a general data structure of attribute specification information that is transmitted from a controller 2, in particular, the controller A. This attribute specification information is sets of a job attribute (support attribute) that can be set in the transmission source controller A and attribute values that can be designated for it. The attribute values that can be designated for the support attributes are pieces of information relating to the setting of the printer A such as sheet trays provided in the printer A and the number of copies (printed sheets) that can be specified in the printer A, and these pieces of information are held by the controller A. The support attributes of the attribute specification information transmitted from the controller A are given respective attribute parameter names.

As soon as attribute specification information is transmitted from a controller 2, the conversion unit 13 receives it, converts individual job attributes (attribute parameter names) contained in the received attribute specification information into common job attributes by referring to the job attribute conversion information, and registers resulting attribute specification information in the converted information memory 16.

(b) of FIG. 6 shows a general data structure of attribute specification information generated by converting the attribute specification information shown in (a) of FIG. 6 by the conversion unit 13 and to be registered in the converted information memory 16. As is understood from comparison between (a) and (b) of FIG. 6, the job attributes are replaced by the respective common job attributes.

It suffices that the conversion unit 13, which acquires attribute specification information repeatedly from each controller 2, overwrites attribute specification information stored in the converted information memory 16 with latest attribute specification information.

Once information to be displayed is generated in the above-described manner, the user interface control processing unit 12 can perform display processing described below.

FIG. 7 shows an example job management picture that is displayed as a result of its selection by a job administrator or the like. As in this display example, a list of pieces of information relating to print jobs stored in the job memory 14 is displayed in the job management picture. Not only can such pieces of information be displayed, but also pieces of information, already set, of an unsent print job can be edited through the job management picture.

The job management picture has a display area 71 for job-related information and a display area 72 for printer (production printer)-related information. The information that is registered in the job memory 14 is mainly displayed in the display area 71. However, for example, pieces of job status information that are transmitted from the controllers 2 are displayed in a "printing status" column 73. Since an individual job status attribute transmitted from a controller 2 is in the form of a job status parameter name, the conversion unit 13 converts it into a common job status attribute by referring to the job status attribute conversion information. The user interface control processing unit 12 refers to and displays the resulting common job status attribute. After execution of a print job, a sheet output destination (i.e., printer 3) is determined by specifying a transmission destination and a logical printer in the display area 71 if they are not specified by the client terminal 1 (they may be specified by the client terminal 1).

In addition to fixed pieces of information relating to the printers 3 such as apparatus types and IP addresses, piece of printer status information that are transmitted from the controllers 2 are displayed in the display area 72. Since an individual printer status attribute that is transmitted from each controller 2 is in the form of a printer status parameter name, the conversion unit 13 converts it into a common printer status attribute by referring to the printer status attribute conversion information. The user interface control processing unit 12 refers to and displays the resulting common printer status attribute.

Figure 8:
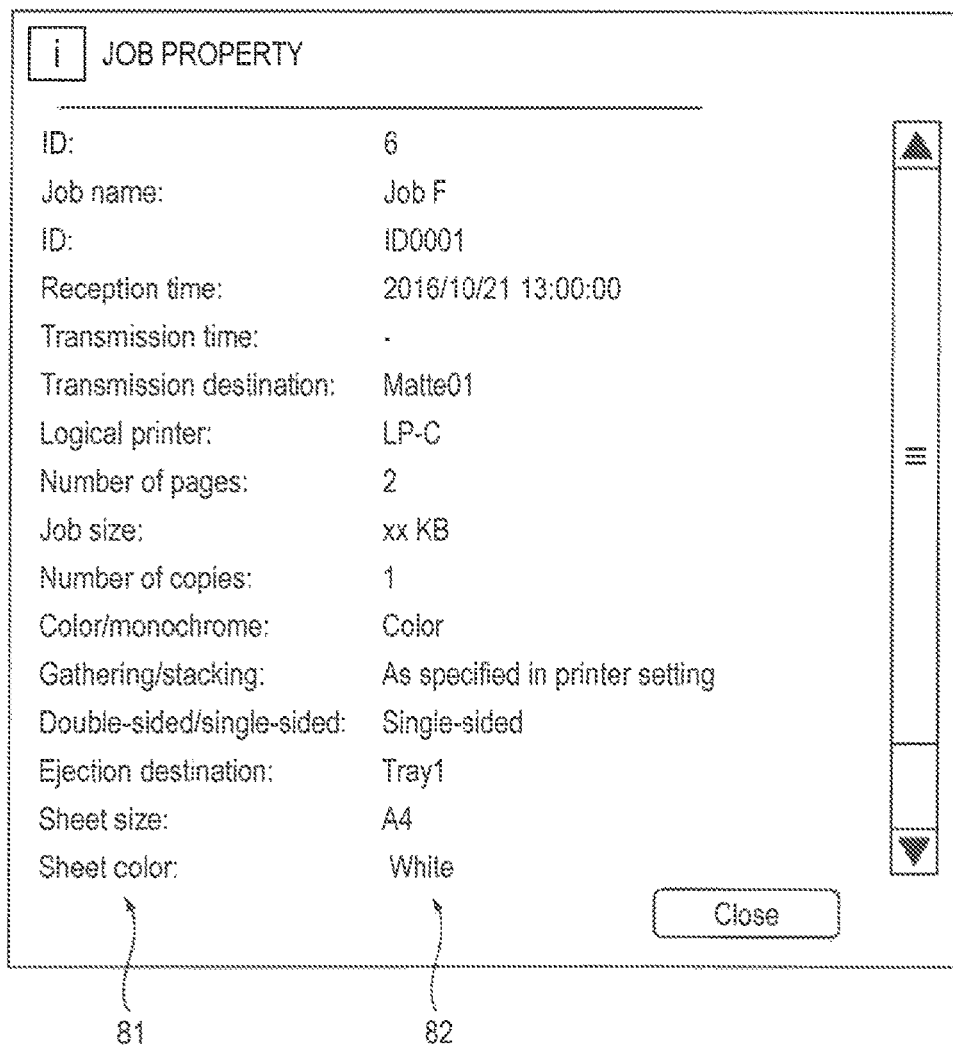
FIG. 8 shows a display example of a print job property picture used in the exemplary embodiment.

FIG. 8 shows a display example of a print job property picture used in the exemplary embodiment. The property picture is one of common pictures provided by the printing managing server 10, and is displayed when a property display button 74 in the job management picture is selected. Job attributes 81 of a print job and attribute values 82 that are set for the respective job attributes are displayed in the property picture so as to be correlated with each other.

The names and the arrangement order of the job attributes 81 are determined in advance, that is, at the time of creation of the property picture and hence are common to, that is, independent of, the controllers 2. The attribute values 82 are stored in the job memory 14 (HDD 24) or the RAM 23. According to the exemplary embodiment, a property picture as exemplified in FIG. 8, which is common to the controller 2, can be provided for a print job to be handled by any kinds of controllers 2 and property information of a print job can be displayed in a common picture whose format is common to the controllers 2.

FIG. 9 shows a display example of a job editing picture used in the exemplary embodiment. The job editing picture is displayed when an edit button 76 is selected after an edit target print job is selected by checking a check box 75 in the job management picture. A job editing picture as exemplified in FIG. 9, which is one of the common pictures and common to the controllers 2, is displayed even if any print job or controller 2 is selected.

Edit boxes 92 are provided in the job editing picture so as to correspond to respective job attributes 91 of the print job, and already set attribute values are displayed in respective edit boxes 92. As in the case of the property picture, the names and the arrangement order of the job attributes 81 are determined in advance, that is, at the time of creation of the job editing picture and hence are common to, that is, independent of, the controllers 2. Already set attribute values are stored in the job memory 14 (HDD 24) or the RAM 23.

If the arrow 93 in an edit box 92 is selected, attribute values that can be designated for the corresponding job attribute in a controller 2 (indicated in the edit box 92 corresponding to a job attribute "transmission destination") to which the edit target print job is assigned are displayed in a pull-down menu (not shown). These attribute values are displayed after being extracted from attribute specification information as exemplified in (b) of FIG. 6. At this time, since the user interface control processing unit 12 refers to the attribute specification information corresponding to the controller 2 currently selected, selection can be made from a different set of attribute value selection candidates even for the same job attribute though the common job editing picture is used.

Conventionally, job editing pictures are prepared for the respective controllers 2 and are different from each other in layout and display items from one controller 2 to another. Thus, a job administrator is required to make different manipulations in different specifying methods depending on the controller 2. In contrast, in the exemplary embodiment, a UI picture that is common to the controllers 2 is prepared and an attribute value that can be set for a controller 2 concerned can be designated through the UI picture.

In the exemplary embodiment, the job editing picture is common to the controllers 2. Likewise, a transmission picture, a copying picture, and a deletion picture that can be selected through the job management picture are prepared as common pictures in the printing managing server 10 and pieces of information relating to a selected print job are displayed in each of those pictures.

In the exemplary embodiment, a printer job manipulation can be made through the job management picture. The printer job manipulation is a manipulation on print job information that has been sent to a controller 2. As shown in FIG. 7, example printer job manipulations are a manipulation for starting or restarting printing, a manipulation for causing test printing, and a manipulation for canceling printing.

Conventionally, a printer job manipulation is made from a controller 2. In contrast, in the exemplary embodiment, since the individual job status attributes are correlated with the respective common job status attributes, the printing managing server 10 can equally deal with job statuses received from the respective controllers 2. This makes it possible to display related information and make a printer job manipulation in or through a common picture.

Incidentally, since information transmitted from a controller 2 is added with identification information of the controller 2, a controller 2 as a transmission source of information received by the printing managing server 10 is determined using such identification information. However, there may occur a case that correct identification information of a controller 2 cannot be received for a certain reason. In the exemplary embodiment, to accommodate such an event, apparatus conversion information may be prepared in advance.

FIG. 10 is a table showing an example data structure of apparatus conversion information used in the exemplary embodiment. In the exemplary embodiment, the apparatus conversion information is set and registered in the conversion rule memory 15. The apparatus conversion information is set in such a manner that pieces of identification information (controller IDs) of the respective controllers 2 are correlated with respective printer model names.

If no controller ID is specified or a correct controller ID is set but a printer model name is contained in such information as attribute specification information transmitted from a controller 2, the conversion unit 13 coverts the printer model name into a controller ID by referring to the apparatus conversion information. With this measure, the user interface control processing unit 12 can identify the information transmission source controller 2.

As described above, in the exemplary embodiment, by setting and utilizing the various kinds of conversion information, the UI pictures that are common to the controllers 2 can be presented to a job administrator or the like. If a controller 2 that can be made a transmission destination is added, the printing managing server 10 additionally registers individual job attributes, individual job status attributes, and individual printer status attributes used in the controller 2 in the respective pieces of conversion information, whereby application of the common pictures to the controller 2 is enabled.

In the exemplary embodiment, when print job information is transmitted from the client terminal 1, the commonization processing unit 11 converts individual job attributes etc. into the common job attributes etc. Alternatively, such conversion may be made when the user interface control processing unit 12 displays a common picture. As a further alternative, the printing managing server 10 may generate a print job in which the common job attributes are set.

What is claimed is:

1. A printing managing apparatus comprising:
    a job attribute correlating information acquiring unit that acquires job attribute correlating information that correlates pieces of individual job attribute information used in plural printing control apparatus with common job attribute information for each job attribute that can be set in print job information;

an attribute specification information converting unit that converts the pieces of individual job attribute information of attribute specification information that contains pieces of individual job attribute information indicating job attributes that can be designated for the job attributes into pieces of common job attribute information using the job attribute correlating information; and a manipulation control processing unit that links print job information with the attribute specification information using pieces of common job attribute information, and displays the print job information that is set to be common to the plural printing control apparatus to allow a manipulation on the displayed print job information.

2. A non-transitory computer readable medium storing a program for causing a computer to function as:
    a job attribute correlating information acquiring unit that acquires job attribute correlating information that correlates pieces of individual job attribute information used in plural printing control apparatus with common job attribute information for each job attribute that can be set in print job information;

an attribute specification information converting unit that converts the pieces of individual job attribute information of attribute specification information that contains pieces of individual job attribute information indicating job attributes that can be designated for the job attributes into pieces of common job attribute information using the job attribute correlating information; and a manipulation control processing unit that links print job information with the attribute specification information using pieces of common job attribute information, and displays the print job information that is set to be common to the plural printing control apparatus to allow a manipulation on the displayed print job information.

* * * * *